(12) United States Patent
Park et al.

(10) Patent No.: US 7,158,371 B2
(45) Date of Patent: Jan. 2, 2007

(54) PORTABLE SWING-TYPE DIGITAL COMMUNICATION DEVICE WITH STEP COMPENSATING MECHANISM

(75) Inventors: Jun-Sang Park, Anyang-si (KR); In-Gon Park, Seoul (KR); Chang-Soo Lee, Incheon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/822,380

(22) Filed: Apr. 12, 2004

(65) Prior Publication Data

US 2005/0063144 A1    Mar. 24, 2005

(30) Foreign Application Priority Data

Sep. 23, 2003   (KR) ...................... 10-2003-0065940

(51) Int. Cl.
*H05K 5/00* (2006.01)
*H04M 1/00* (2006.01)

(52) U.S. Cl. .................... 361/679; 455/575.4
(58) Field of Classification Search ................ 361/681, 361/679; 343/702; 379/433.11, 433.13, 379/433.01; 16/362, 378, 379, 726, 727, 16/679, 683, 303, 342, 229, 239, 246, 248, 16/265, 284–286, 296, 300, 312, 313, 344, 16/345, 347, 355, 357, 367, 377, 386; 455/351, 455/575.4

See application file for complete search history.

(56) References Cited

U.S. PATENT DOCUMENTS 5,485,517 A * 1/1996 Gray ..................... 379/433.13
6,822,871 B1 * 11/2004 Lee et al. .................... 361/727
2001/0048589 A1 * 12/2001 Brandenberg et al. ....... 361/683
2002/0102946 A1 * 8/2002 SanGiovanni ................ 455/90
2002/0163504 A1 * 11/2002 Pallakoff ..................... 345/169
2003/0090468 A1 * 5/2003 Finke-Anlauff ............. 345/169
2003/0164881 A1   9/2003 Ohe et al.
2004/0048632 A1 * 3/2004 Kuroda ..................... 455/550.1
2004/0248628 A1 * 12/2004 Taninai ..................... 455/575.3

FOREIGN PATENT DOCUMENTS

EP   1 207 671    5/2002
EP   1 271 897    1/2003
EP   1 467 537    10/2004

\* cited by examiner

*Primary Examiner*—Lisa Lea-Edmonds
*Assistant Examiner*—Corey Broussard
(74) *Attorney, Agent, or Firm*—The Farrell Law Firm

(57) ABSTRACT

Disclosed herein is a portable swing-type digital communication device with a step compensating mechanism. The portable swing-type digital communication device comprises a body housing, and a swing housing rotatably attached to the body housing by means of a hinge module. The swing housing is rotatable about a hinge axis at a prescribed angle perpendicular to the top surface of the body housing. The swing housing being disposed at a prescribed angle to a planar surface of the body housing when the swing housing is rotated a prescribed angle from the body housing. Also, the portable swing-type digital communication device comprises a step compensating mechanism for preventing a step between the top surface of the body housing and the top surface of the swing housing when the swing housing is rotated to the prescribed angle from the body housing.

8 Claims, 8 Drawing Sheets

PORTABLE SWING-TYPE DIGITAL COMMUNICATION DEVICE WITH STEP COMPENSATING MECHANISM

PRIORITY

This application claims priority to an application entitled "PORTABLE SWING-TYPE DIGITAL COMMUNICATION DEVICE WITH STEP COMPENSATING MECHANISM", filed in the Korean Intellectual Property Office on Sep. 23, 2003 and assigned Ser. No. 2003-65940, the contents of which are incorporated herein by reference.

BACKGROUND OF THE INVENTION

1. Field of the Invention

The present invention relates to a portable communication device including cellular phones, personal digital assistants and hand held personal computers, and more particularly to a portable swing-type digital communication device with a step compensating mechanism.

2. Description of the Related Art

Generally, "portable communication devices" defines electronic devices that are portable and enable owners of the devices to communicate in a wireless environment. Such portable communication devices have become increasingly small, slim, and lightweight, whereby portability thereof has greatly improved. Furthermore, such portable communication devices have been adapted to transmit multimedia data, whereby the devices have various additional functions. Future portable communication devices will continue to be miniaturized, lightweight, multipurpose devices with various functions, which will be easily adapted to various multimedia and Internet environments. It is expected that the portable communication devices will be modified into complex electronic devices with various functions. Portable communication devices are commonly used by people of all ages and both sexes all over the world, which are considered as necessities of life.

On the basis of their forms, the portable communication devices may be classified into several types of communication devices. For example, the portable communication devices may be classified into a bar-type communication device, a flip-type communication device, and a folder-type communication device. The bar-type communication device has a bar-type single housing, the flip-type communication device comprises a bar-type housing and a flip part pivotably attached to the housing, and the folder-type communication device comprises a bar-type housing and a folder part pivotably attached to the housing.

On the basis of where or how they are carried, the portable communication devices may also be classified into a necklace-type communication device and a wrist-type communication device. The necklace-type communication device is worn on the neck of a user by means of a string, and the wrist-type communication device is worn on the wrist of the user.

Furthermore, people may wish to carry the portable communication devices more conveniently and comfortably in the future. It is expected, therefore, to provide spectacle-type communication devices or headphone-type communication devices.

On the basis of how they are opened or closed, the portable communication devices may be further classified into a rotating-type (or swing-type) communication device and a sliding-type communication device. Other types include a folder type and a flip-type portable communication device. The rotating-type communication device is characterized in that two housings are rotatably connected to each other while the housings are continuously opposite to each other. The rotating-type communication device is opened or closed by the rotation of the two housings in such a manner that the housings are rotated apart from or close to each other. On the other hand, the sliding-type communication device is characterized in that two housings are longitudinally slid. The sliding-type communication device is opened or closed by the sliding movement of the two housings in such a manner that the housings are slid apart from or close to each other.

The above-mentioned various types of communication devices will be easily appreciated by a person having an ordinary skill in the art.

The portable communication devices have also been adapted to transmit/receive data at high speed in addition to an audio communication function. Consequently, the portable communication devices use wireless communication technology for transmitting data at high speed, which will satisfy the increasing desires of the consuming public.

It is another increasing trend that a camera lens is adopted in each portable communication device to transmit image signals. The portable communication device has a camera lens module mounted outside or inside a main body of the portable communication device so that a user of the device can talk with a user of another of the devices while looking at each other, or take pictures of his/her desired subjects.

In the conventional communication device, especially the conventional rotating-type or swing type communication device, however, one of two housings, i.e., a swing housing, is protruded by its thickness from the top surface of the other of the housings, i.e., a body housing when the swing housing is rotated an angle of approximately 180 degrees from the body housing. Consequently, it is very inconvenient to manipulate the keys of the communication device, and the portable communication device comprising such body and swing housings is not externally aesthetically pleasing. That is to say, there occurs a step corresponding to the thickness of the swing housing between the top surface of the body housing and the top surface of the swing housing, whereby it is very inconvenient to manipulate the keys on the communication device, and the portable communication device is not externally aesthetically pleasing.

SUMMARY OF THE INVENTION

Therefore, the present invention has been made in view of the above problem, and it is an object of the present invention to provide a portable digital communication device wherein no step occurs between the top surface of a body housing and the top surface of a swing housing placed adjacent to the top surface of the body housing when the swing housing is rotated an angle of approximately 180 degrees from the body housing.

It is another object of the present invention to provide a portable digital communication device wherein a swing housing is disposed at a prescribed angle to a body housing when the swing housing is rotated an angle approximately 180 degrees from the body housing.

It is yet another object of the present invention to provide a portable digital communication device wherein no step occurs between a key array arranged on a body housing and a key array arranged on a swing housing, and simultaneously the key array of the swing housing is closest to the key array of the body housing when the swing housing is rotated an angle of approximately 180 degrees from the body housing.

In accordance with the present invention, the above and other objects can be accomplished by the provision of a portable swing-type digital communication device comprising: a body housing; a swing housing rotatably attached to the body housing by means of a hinge module, the swing housing being rotatable about a hinge axis perpendicular to the top surface of the body housing, the swing housing being disposed at a prescribed angle to a planar surface of the body housing when the swing housing is rotated to a prescribed angle from the body housing; and a step compensating mechanism for preventing a step between the top surface of the body housing and the top surface of the swing housing when the swing housing is rotated to the prescribed angle from the body housing.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
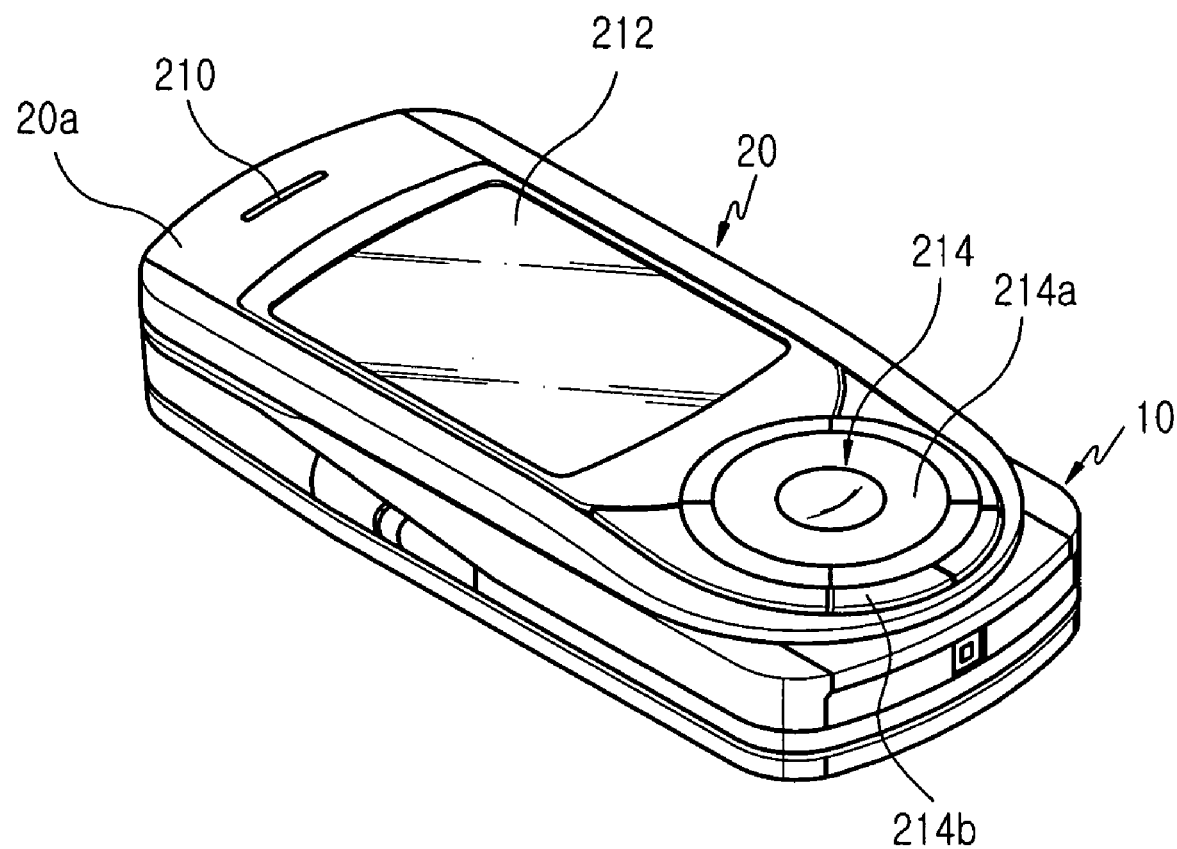
FIG. 1 is a perspective view of a portable swing-type digital communication device according to a preferred embodiment of the present invention.
Figure 2:
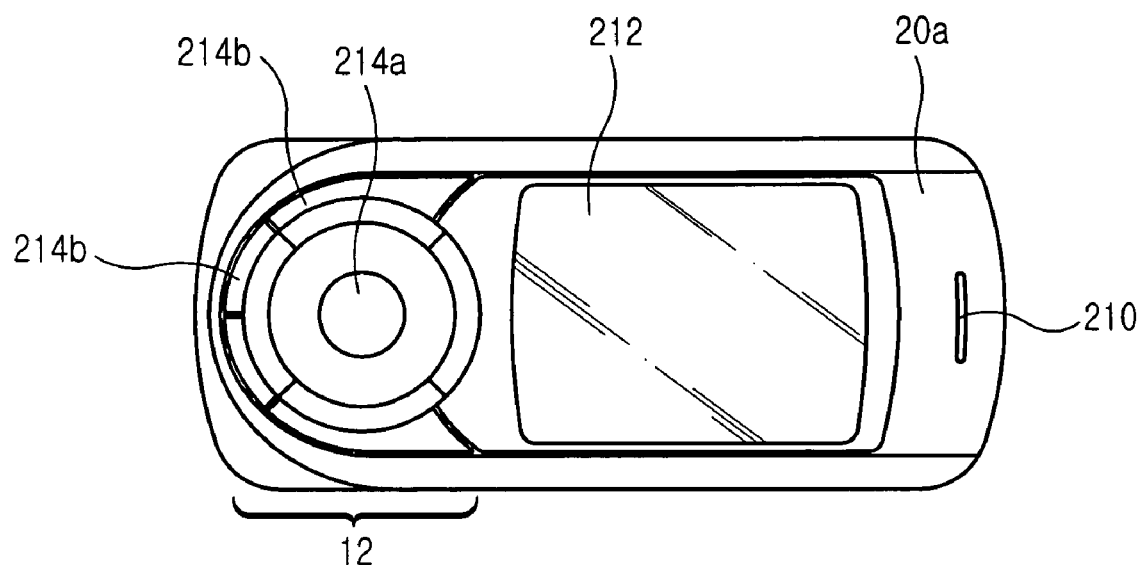
FIG. 2 is a plane view of the portable swing-type digital communication device shown in FIG. 1.

Now, a preferred embodiment of the present invention will be described in detail with reference to the accompanying drawings. In the following, a detailed description of known functions and configurations incorporated herein will be omitted when it may obscure the subject matter of the present invention.

As shown in FIGS. 1 to 10, a portable digital communication device according to a preferred embodiment of the present invention comprises the following components. A body housing 10, a swing housing 20 disposed on the body housing 10 and rotatable about a hinge axis A while the swing housing 20 is continuously opposite to the body housing 10, and a step compensating mechanism for preventing a step between the top surface 10a of the body housing 10 and the top surface 20a of the swing housing 20 when the swing housing is rotated a prescribed angle from the body housing 20. The step compensating mechanism will be described in detail later. The hinge axis A is at a prescribed angle θ (See FIG. 6) perpendicular to the top surface 10a of the body housing 10. Preferably, the body and swing housings 10 and 20 are bar-type housings.

Figure 5:
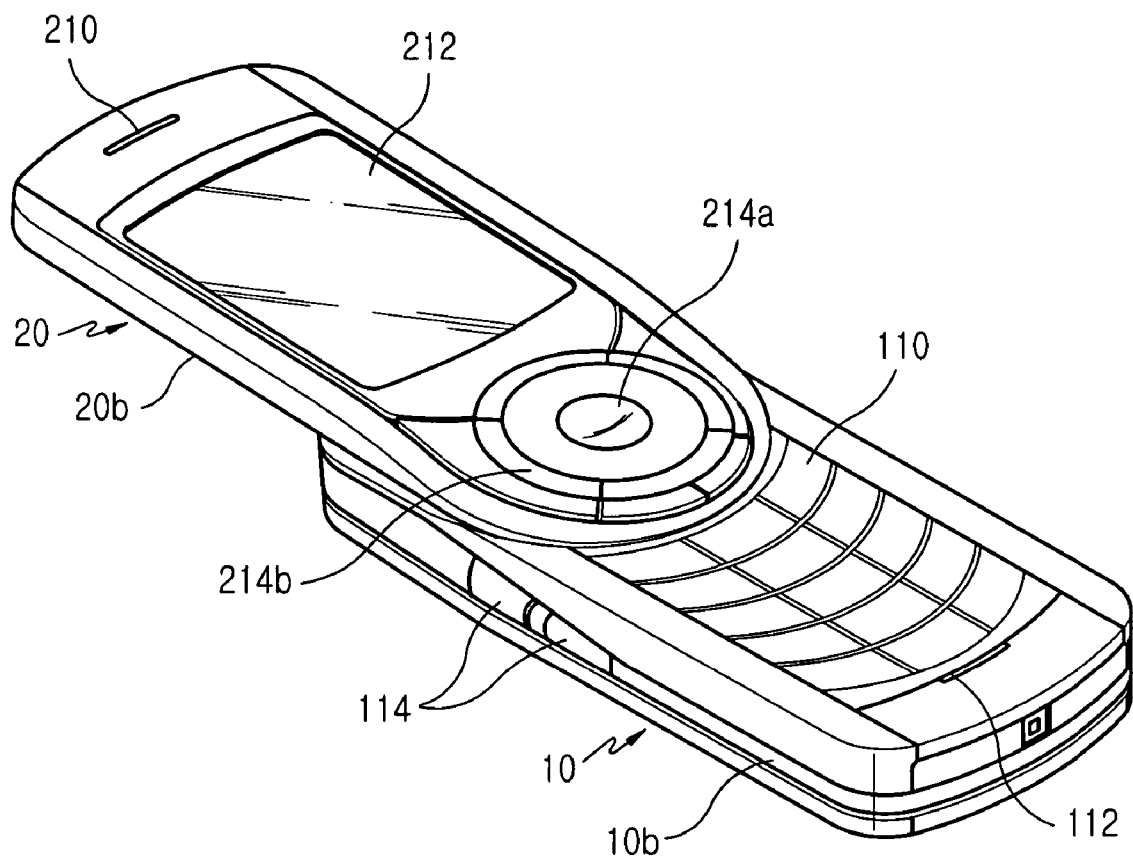
FIG. 5 is a perspective view of the portable swing-type digital communication device of FIG. 1 showing the swing housing rotated to an angle of approximately 180 degrees from the body housing.
Figure 6:
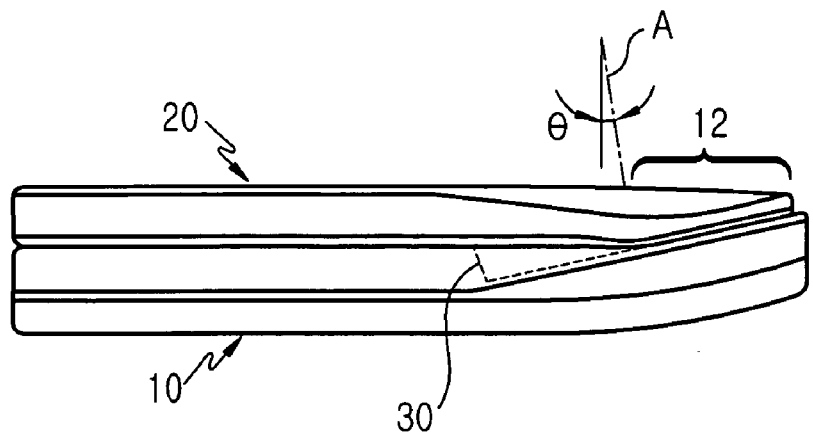
FIG. 6 is a side view of the portable swing-type digital communication device shown in FIG. 1.

When the swing housing 20 is entirely placed on the body housing 10 as shown in FIG. 1, the body housing 10 and the swing housing 20 are parallel to each other, and the top surface 10a of the body housing 10 is closest to the bottom surface 20b of the swing housing 20. When the swing housing 20 is rotated from the body housing 10 as shown in FIG. 5, the swing housing 20 is placed at a prescribed angle to the body housing 10, and the top surface 10a of the body housing 10 is farthest from the bottom surface 20b of the swing housing 20. Furthermore, the bottom surface 20b of the swing housing 20 is not opposite to the top surface 10a of the body housing 10.

The body housing 10 has side surfaces 10b and a bottom surface 10c in addition to the top surface 10a. On the top surface 10a of the body housing 10 are arranged a first key array 110 comprising a plurality of keys, and a microphone unit 112 disposed adjacent to the first key array 110. Specifically, the first key array 112 comprises character keys, numeral keys, a power key, an end key, a delete key, function keys, and special keys.

Figure 3:
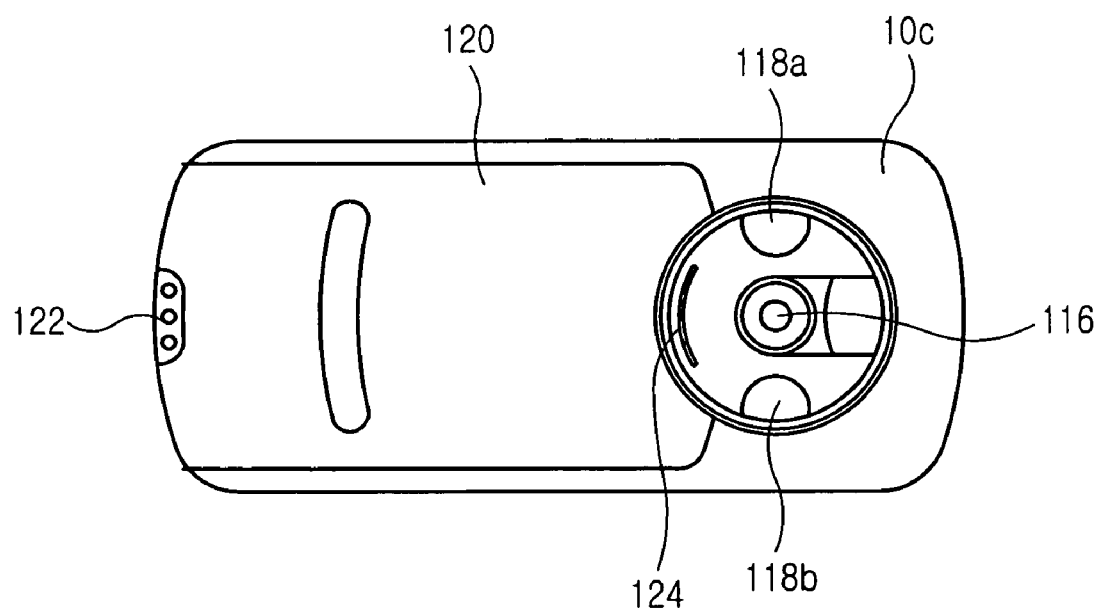
FIG. 3 is a bottom view of the portable swing-type digital communication device shown in FIG. 1.
Figure 4:
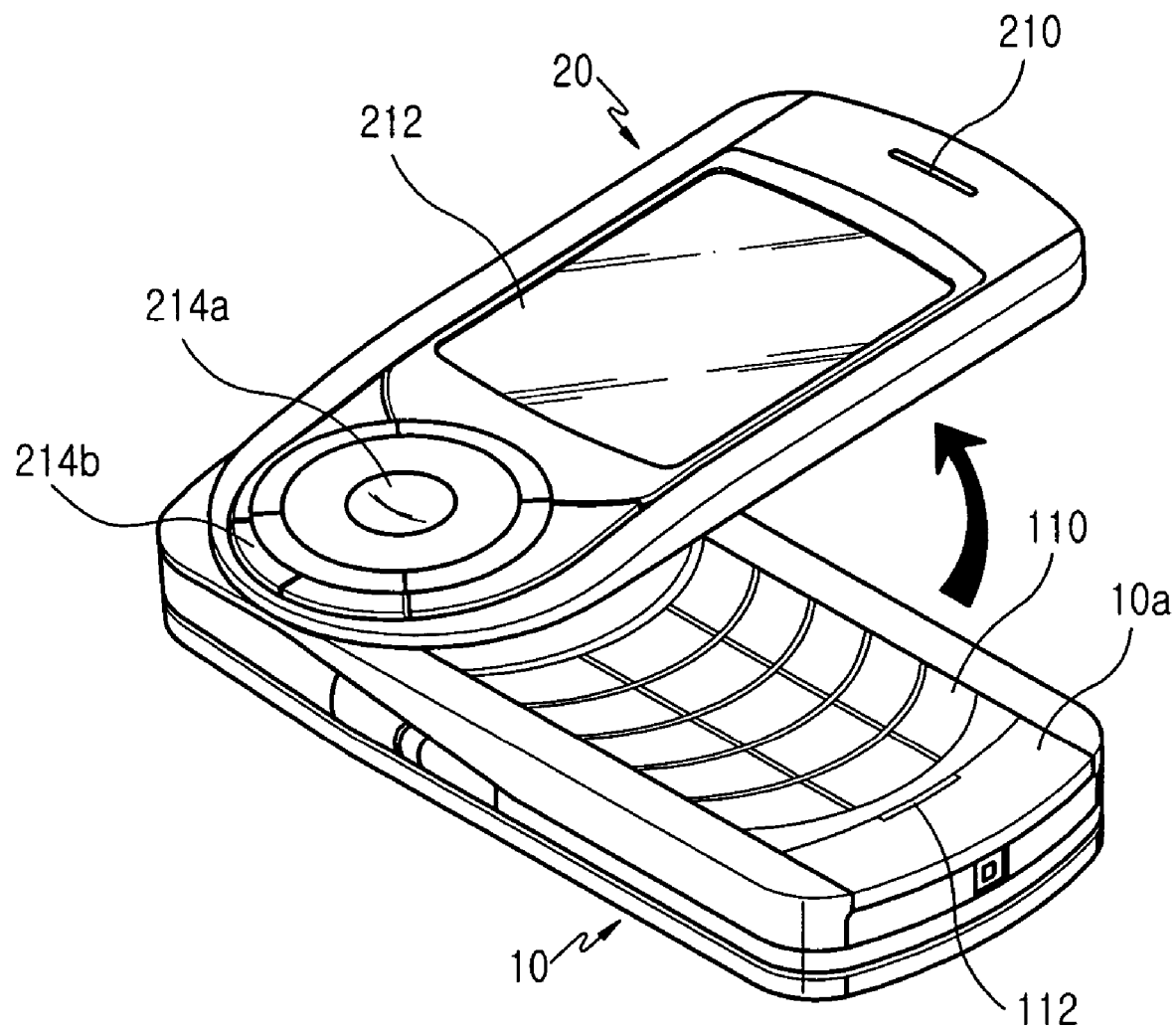
FIG. 4 is a perspective view of the portable swing-type digital communication device of FIG. 1 showing a swing housing rotated to an angle of approximately 90 degrees from a body housing.

On one of the side surfaces 10b of the body housing 10 is arranged a second key array 114 comprising a plurality of keys. On the bottom surface 10c of the body housing 10, as shown in FIG. 3, are arranged a battery pack 120, a camera lens 116, which is disposed adjacent to the battery pack 120, and a lighting unit, which is disposed adjacent to the camera lens 116. Preferably, the lighting unit comprises a pair of lighting parts 118a and 118b, which are opposite to each other around the camera lens 116. The reference numeral 124 indicates a locking knob, and the reference numeral 122 indicates a charging terminal.

As described above, the swing housing 20 has the top surface 20a and the bottom surface 20b. On the top surface 20a of the swing housing 20 are arranged a speaker unit 210, a display unit 212, which is disposed adjacent to the speaker unit 210, and a third key array comprising a plurality of keys, which is adjacent to the display unit 210. Specifically, the third key array comprises a rotary key 214a disposed at the center thereof and several function keys 214b disposed around the rotary key 214a. The display unit 2121 may be made up of an LCD module, a touch screen, or a holographic screen.

As shown in FIGS. 6 to 10, the step compensating mechanism comprises the following components. A semicircular section 12 is formed at one end of the swing housing 20. A compensating member 32 is protruded at a prescribed position of the bottom surface 10c of the swing housing 20. A recess 30 is formed at a prescribed area of the body housing 10 for accommodating the semicircular section 12 and the compensating member 32 of the swing housing 20 while being continuously opposite to the compensating member 32.

Figure 9:
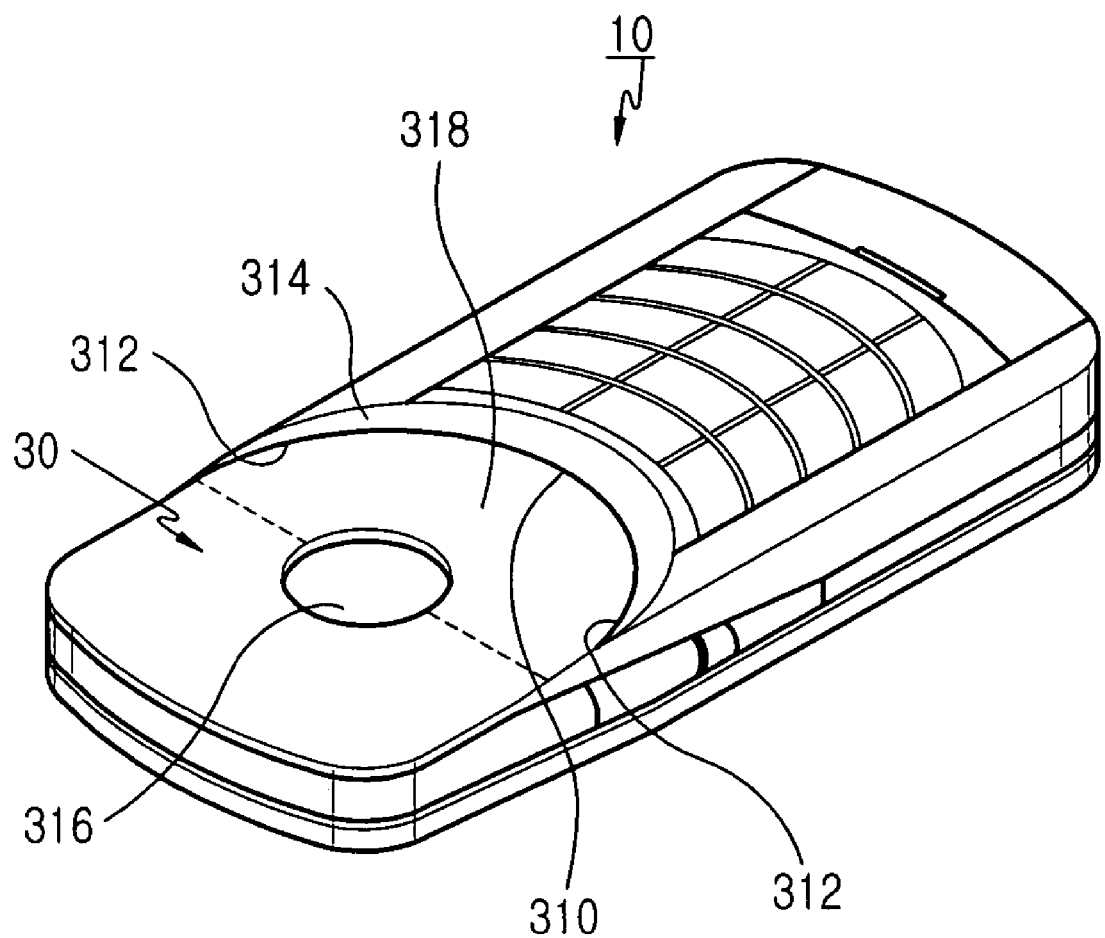
FIG. 9 is a perspective view showing the top surface of the body housing according to the present invention.

As shown in FIG. 9, the recess 30 is formed such that the recessed depth of the recess 30 is gradually decreased from the middle 310 of an inner wall 314 formed at the recess 30 to both ends 312 of the inner wall 314. In other words, the recessed depth of the recess 30 is the largest at the middle 310 of the inner wall 314. The reference numeral 316 indicates an insertion hole into which a hinge module (not shown) is inserted.

Figure 10:
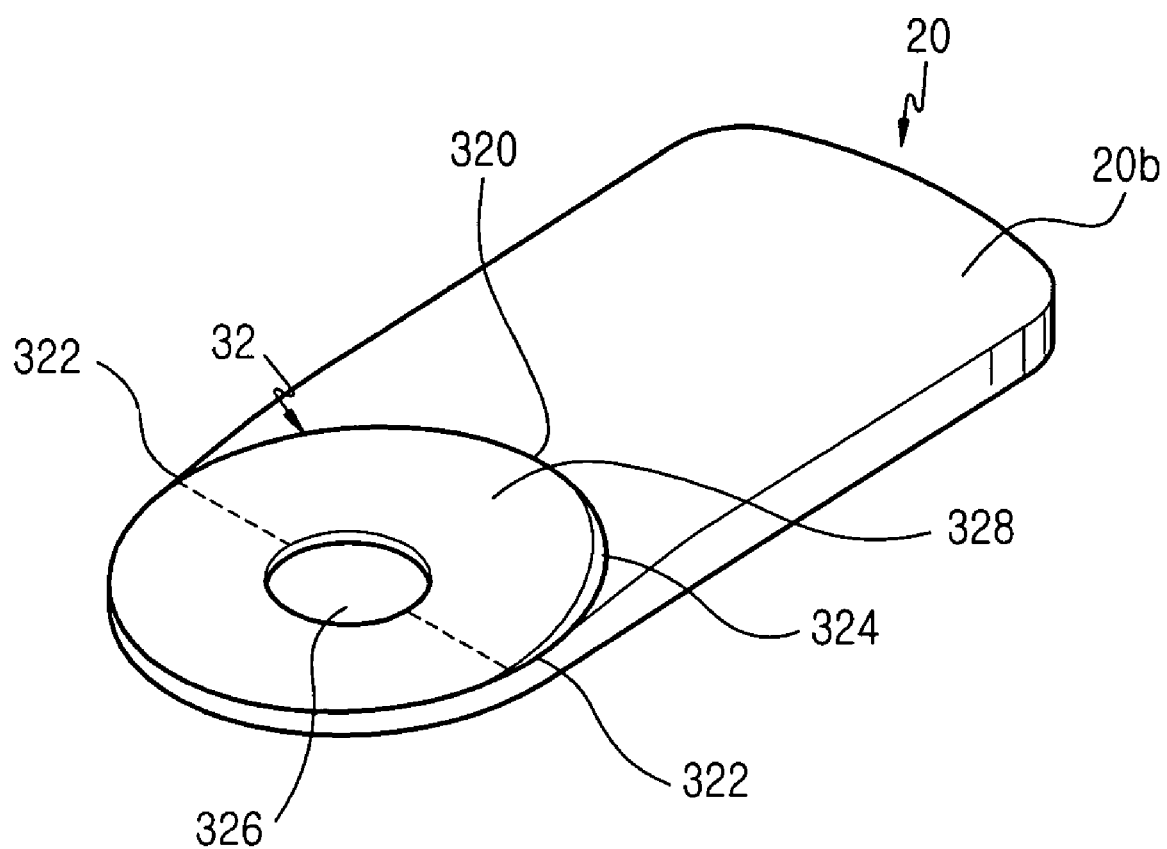
FIG. 10 is a perspective view showing the bottom surface of the swing housing according to the present invention.

As shown in FIG. 10, the compensating member 32 is formed such that the protruded height of the compensating member 32 is gradually increased from the middle 320 of an outer wall 324 formed at the compensating member 32 to both ends 322 of the outer wall 324. In other words, the protruded height of the compensating member 32 is the largest at the middle 320 of the outer wall 324. The reference numeral 326 indicates a through-hole through which the hinge module is inserted.

As described above, the compensating member 32 and the recess 30 are formed in the shapes supplementary to each other. The compensating member 32 has a semicircular top surface 328, and the recess 30 has a semicircular bottom surface 318. The compensating member 32 is rotated on the recess 30 in a sliding fashion while the top surface 328 of the compensating member 32 is continuously opposite to the bottom surface 318 of the recess 30.

Figure 7:
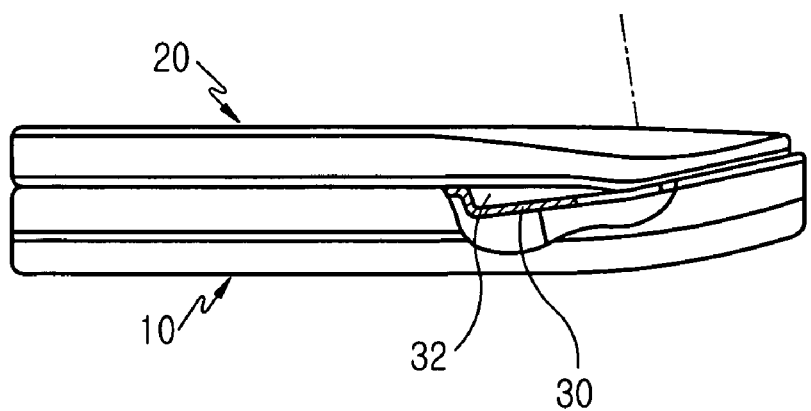
FIG. 7 is a partial cutaway side view of the portable swing-type digital communication device of FIG. 6, showing a step compensating mechanism according to the present invention.
Figure 8:
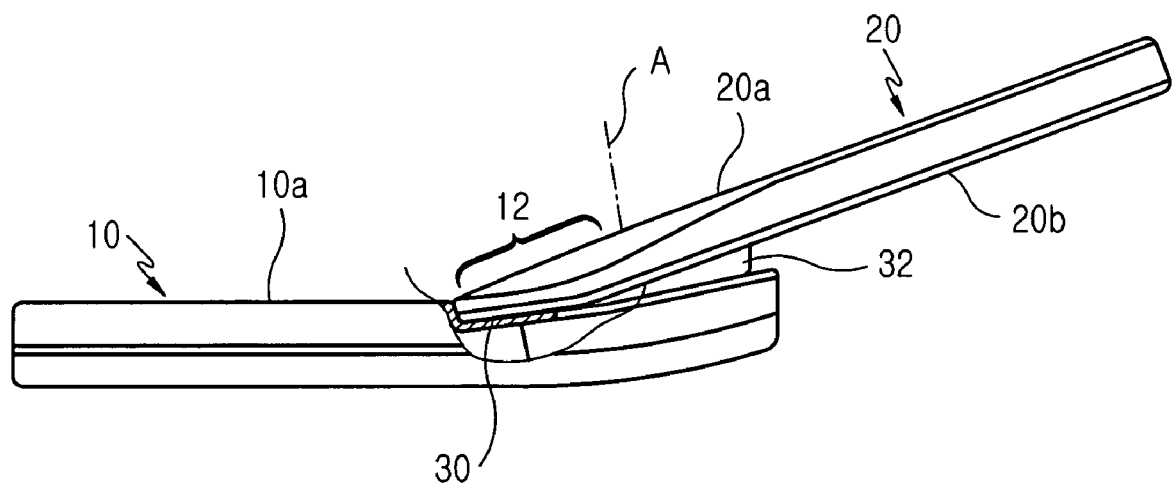
FIG. 8 is a partial cutaway side view of the portable swing-type digital communication device of FIG. 5, showing the step compensating mechanism according to the present invention.

When the swing housing 20 is entirely placed on the body housing 10, the compensating member 32 is completely accommodated in the recess 30 as shown in FIG. 7. When the swing housing 20 is rotated to an angle of approximately 180 degrees from the body housing 10, the compensating member 32 is partially accommodated in the recess 30 as shown in FIG. 8.

When the swing housing 20 is rotated to an angle of approximately 180 degrees from the body housing 10 as shown in FIG. 5, the third key array, compressed of elements 214a and 214b, is closest to the first key array 110, and the speaker unit 210 is farthest from the microphone unit 112.

The portable digital communication device of the present invention includes the step compensating mechanism as described above. When the swing housing 20 is placed at a prescribed angle to the body housing 10, there is no step between the top surface 10a of the body housing 10 and the top surface 20a of the swing housing 20.

As apparent from the above description, the present invention provides a portable digital communication device with a step compensating mechanism. Consequently, keys of first and third key arrays can be conveniently manipulated when a swing housing is rotated from a body housing. Furthermore, no step occurs between the top surface of the body housing and the top surface of the swing housing, whereby the portable communication device of the present invention has a pleasing external appearance.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A portable swing-type digital communication device comprising:

a body housing;

a swing housing rotatably attached to the body housing by means of a hinge module, the swing housing rotatable about a hinge axis at a prescribed angle perpendicular to the top surface of the body housing, the swing housing being disposed at a prescribed angle to a planar surface of the body housing when the swing housing is rotated to a prescribed angle from the body housing; and a step compensating mechanism eliminating the step between the top surface of the body housing and the top surface of the swing housing when the swing housing is rotated to the prescribed angle from the body housing; comprising:

a semicircular section formed at one end of the swing housing;

a compensating member protruded at a prescribed position of the bottom surface of the swing housing; and a recess formed at prescribed area of the body housing for accommodating the semicircular section and the compensating member of the swing housing while being continuously opposite to the compensating member.

2. The device as set forth in claim 1, wherein the body housing comprises:

a first key array and a microphone unit arranged on the top surface thereof, the first key array having a plurality of keys, the microphone unit being disposed adjacent to the first key array;

a second key array arranged on one of the side surfaces thereof, the second key array having a plurality of keys; and a camera lens and a lighting unit arranged on the bottom surface thereof, the lighting unit being disposed adjacent to the camera lens and having a pair of lighting components.

3. The device as set forth in claim 1, wherein the swing housing has a speaker unit, a display unit, and a key array arranged on the top surface thereof, the display unit being disposed adjacent to the speaker unit, the key array comprising at least one key disposed adjacent to the display unit.

4. The device as set forth in claim 1, wherein the compensating member is formed such that the protruded height of the compensating member is gradually increased from the middle of an outer wall formed at the compensating member to both ends of the outer wall, the protruded height of the compensating member being the largest at the middle of the outer wall.

5. The device as set forth in claim 1, wherein the recess is formed such that the recessed depth of the recess is gradually decreased from the middle of an inner wall formed at the recess to both ends of the inner wall, the recessed depth of the recess being the largest at the middle of the inner wall.

6. The device as set forth in claim 1, wherein the compensating member and the recess are formed in the shapes supplementary to each other, and wherein the compensating member has a semicircular top surface, and the recess has a semicircular bottom surface.

7. The device as set forth in claim 1, wherein the compensating member is completely accommodated in the recess when the swing housing is entirely placed on the body housing, and the compensating member is partially accommodated in the recess when the swing housing is rotated an angle of approximately 180 degrees from the body housing.

8. The device as set forth in claim 1, wherein a key array on the top surface of the swing housing is closest to a first key array, and a speaker unit is farthest from a microphone unit when the swing housing is rotated to an angle of approximately 180 degrees from the body housing.

* * * * *